(12) United States Patent
Hung et al.

(10) Patent No.: US 11,266,079 B2
(45) Date of Patent: Mar. 8, 2022

(54) POT ASSEMBLY WITH A SAUCER (71) Applicant: ATT Southern, Inc., Camp Hill, PA (US)

(72) Inventors: Chun Hung, Dillsburg, PA (US); Amy Brinckerhoff, Marietta, GA (US); Robert Stein, Camp Hill, PA (US)

(73) Assignee: ATT Southern, Inc., Camp Hill, PA (US)

(*) Notice: Subject to any disclaimer, the term of this patent is extended or adjusted under 35 U.S.C. 154(b) by 281 days.

(21) Appl. No.: 16/267,717

(22) Filed: Feb. 5, 2019

(65) Prior Publication Data

US 2020/0245566 A1 Aug. 6, 2020

(51) Int. Cl.
*A01G 9/04* (2006.01)
*A01G 9/02* (2018.01)
*B65G 57/03* (2006.01)

(52) U.S. Cl.
CPC ............ *A01G 9/042* (2013.01); *A01G 9/021* (2013.01); *A01G 9/04* (2013.01); *B65G 57/03* (2013.01); *B65G 2201/0235* (2013.01)

(58) Field of Classification Search
CPC .......... A01G 9/02; A01G 27/02; A01G 31/06; A01G 25/16; A01G 7/045; A01G 9/021; A01G 9/022; A01G 9/023; A01G 9/028; A01G 27/008; A01G 27/06; A01G 9/027; A01G 9/04; A01G 9/042; A01G 9/24; A01G 13/0275; A01G 22/00; A01G 27/001; A01G 27/003; A01G 27/005; A01G 27/04; A01G 29/00; A01G 7/02; A01G 9/006; A01G 9/026; A01G 9/12; A01G 9/14; A01G 9/18; A01G 9/20; A01G 9/246; A01G 9/247; A01G 9/249
See application file for complete search history.

(56) References Cited

U.S. PATENT DOCUMENTS

| | | | |
|---|---|---|---|
| 1,391,353 A | 9/1921 | Wells | |
| D125,058 S | 2/1941 | Ratner | |
| 3,949,524 A | 4/1976 | Mickelson | |
| 8,191,310 B2 | 6/2012 | Keats | |
| 2006/0037241 A1* | 2/2006 | Orschulik | A01G 9/021 47/65.5 |
| 2016/0198641 A1 | 7/2016 | Lee | |
| 2020/0146232 A1* | 5/2020 | Hemerka | A01G 27/006 |

FOREIGN PATENT DOCUMENTS

| | | |
|---|---|---|
| CA | 2238914 C | 11/1999 |
| CN | 206101034 U | 4/2017 |
| JP | 2004201620 A * | 7/2004 |

OTHER PUBLICATIONS

Extended European Search Report for Application No. 20155274.2, dated Aug. 12, 2020, 8 pages.
http://www.southernpatio.com/products/beehive/hdr-035633-12-beehive-planter-green/, HDR-035633 12 inch Beehive Green HR Pro, Mar. 6, 2018, 5 pages.
European Office Action for Application No. 20 155 274.2, dated Apr. 29, 2021, 6 pages.

* cited by examiner

*Primary Examiner* — Timothy D Collins
*Assistant Examiner* — Brittany A Lowery
(74) *Attorney, Agent, or Firm* — Brooks Kushman P.C.

(57) ABSTRACT

A pot with a base is pivotally connected to, and supported upon a saucer. A cam surface is provided between the saucer and the pot so that rotation of the pot in a first rotary direction relative to the saucer extends the pot from the saucer, and rotation of the pot in a second rotary direction relative to the saucer retracts the pot to the saucer.

19 Claims, 7 Drawing Sheets

POT ASSEMBLY WITH A SAUCER

TECHNICAL FIELD

Various embodiments relate to pot assemblies with a saucer.

BACKGROUND

Pots and pot assemblies have been utilized for potting plants and the like. Pot assemblies have been provided with an underlying saucer for collecting water that passes through an aperture in the pot.

SUMMARY

According to an embodiment, a pot assembly is provided with a saucer, and a pot with a base pivotally connected to, and supported upon the saucer. A cam surface is provided between the saucer and the pot so that rotation of the pot in a first rotary direction relative to the saucer extends the pot from the saucer, and rotation of the pot in a second rotary direction relative to the saucer retracts the pot to the saucer.

According to a further embodiment, at least one fastener connects the pot to the saucer.

According to another further embodiment, the pot is provided with a sidewall extending from the base to collectively provide a cavity with the base.

According to an even further embodiment, at least one aperture is provided in the base so that the saucer is in fluid communication with the cavity of the pot.

According to another even further embodiment, at least one fastener connects the pot to the saucer.

According to another even further embodiment, the at least one fastener is mounted to the saucer and cooperates in the at least one aperture in the base.

According to a further embodiment, the cam surface is defined as at least two cam surfaces formed in one of the base and the saucer. The pot assembly is further provided with at least two cam followers formed in another of the base and the saucer.

According to another further embodiment, the cam surface is defined as at least two cam surfaces formed beneath the base, and at least two cam surfaces formed in the saucer.

According to an even further embodiment, the at least two base cam surfaces cooperate with the at least two saucer cam surfaces to diverge in the first rotary direction to extend the pot from the saucer, and to collapse in the second rotary direction to retract the pot to the saucer.

According to another even further embodiment, at least two complementary surfaces are formed in the base, offset and corresponding to the at least two cam surfaces formed beneath the base. At least two complementary surfaces are formed beneath the saucer, offset and corresponding to the at least two cam surfaces formed in the saucer. The at least two saucer complementary surfaces are sized to be received upon the at least two base complementary surfaces for collapsed and compact packing of multiple pot assemblies.

According to another further embodiment, the saucer is provided with a first support extending from the saucer. The pot is provided with a second support extending down from the base to align with the first support in an extended position to collectively support the base relative to the saucer.

According to an even further embodiment, the first support and the second support are each generally frusto-conical.

According to another embodiment, a pot assembly is provided with a saucer with a first series of arcuate ramps. A pot with a base is pivotally connected to, and supported upon the saucer. The base is provided with a corresponding second series of arcuate ramps in cooperation with the first series of arcuate ramps so that rotation of the pot in a first rotary direction relative to the saucer extends the pot from the saucer, and rotation of the pot in a second rotary direction relative to the saucer retracts the pot to the saucer.

According to a further embodiment, the pot is provided with a sidewall extending from the base to collectively provide a cavity with the base. At least one aperture is provided in the base so that the saucer is in fluid communication with the cavity of the pot.

According to an even further embodiment, at least one fastener connects the pot to the saucer.

According to another even further embodiment, the at least one fastener is mounted to the saucer and cooperates in the at least one aperture in the base.

According to another further embodiment, the first series of arcuate ramps are formed in the saucer; and the second series of arcuate ramps are formed beneath the base.

According to an even further embodiment, the first series of arcuate ramps cooperate with the second series of arcuate ramps to expand in the first rotary direction to extend the pot from the saucer, and to collapse in the second rotary direction to retract the pot to the saucer.

According to another even further embodiment, the first series of arcuate ramps is formed in and beneath the saucer. The second series of arcuate ramps is formed in and beneath the base of the pot. The first series of arcuate ramps is sized to be received upon the second series of arcuate ramps for collapsed and compact packing of multiple pot assemblies.

According to another embodiment, a method for packaging a pot assembly provides a saucer with a first series of arcuate ramps. A pot is provided with a base with a corresponding second series of arcuate ramps. The pot is pivotally connected to the saucer. The pot is rotated in a first rotary direction relative to the saucer to retract the pot to the saucer.

According to another embodiment, a method for stacking pot assemblies provides a first pot assembly and a second pot assembly, each packaged by providing a saucer with a first series of arcuate ramps. A pot is provided with a base with a corresponding second series of arcuate ramps. The pot is pivotally connected to the saucer. The pot is rotated in a first rotary direction relative to the saucer to retract the pot to the saucer. The first pot assembly is stacked onto the second pot assembly such that the first series of arcuate ramps of the first pot assembly are engaged with the second series of arcuate ramps of the second pot assembly.

According to another embodiment, a method for unpackaging a pot assembly obtains a pot assembly provided with a saucer with a first series of arcuate ramps. A pot is provided with a base with a corresponding second series of arcuate ramps. The pot is pivotally connected to the saucer. The pot is rotated in a first rotary direction relative to the saucer to retract the pot to the saucer. The pot is rotated in a second rotary direction relative to the saucer to extend the pot from the saucer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1-6 illustrate a pot assembly 20 according to an embodiment. The pot assembly 20 includes a pot 22 with a base 24 (FIGS. 3 and 4) and an upwardly extending sidewall 26. The base 24 and the sidewall 26 collectively provide a cavity 28. The cavity 28 in the pot is sized to receive potting materials, such as soil and pebbles, for planting a plant within the cavity 28.

Potted plants are typically watered. To assist in this process, the pot typically includes apertures in the base to drain excess water into a saucer or drainage plate. The excess water in the saucer is typically exposed to an ambient environment for evaporation. Alternatively, the plant may subsequently draw water from the pot and consequently from the excess water in the saucer.

The pot assembly 20 includes a plurality of apertures 30 (FIG. 4) formed through the base 24 for permitting drainage of excess water. A saucer 32 is connected to the base 24 and sized to extend laterally beyond the base 24 and beneath the apertures 30 for receipt of excess drainage from the cavity 28. The saucer 32 also has a base 34 (FIG. 3) with a sidewall 36 to collectively provide a cavity 38 (FIG. 3) to receive and retain the drainage from the pot 22.

The saucer 32 is sized and shaped to have an external ornamental appearance that is integrated into the ornamental appearance of the pot 22. The pot 22 may be formed or molded from a polymeric material. The saucer 32 may also be molded from the same polymeric material.

For the depicted embodiment, the saucer 32 is connected to the pot 22 and cooperates with the pot 22 to extend and retract relative to the pot 22. The saucer 32 is illustrated in a retracted position in FIGS. 1-4 and 6. FIGS. 7-10 illustrate the pot assembly 20 with the saucer 32 in an extended position for utilization of the saucer 32. The expandable and retractable saucer 32 permits the end user to determine whether or not the saucer 32 is employed. When the saucer 32 is not utilized for exposing the excess water to the ambient environment, then the compact pot assembly 20 arrangement with a consistent overall ornamental appearance of FIGS. 1-4 and 6 is utilized. Likewise, the compact retracted position of the pot assembly 20 of FIGS. 1-4 and 6 may also be employed for compact packaging.

Figure 1:
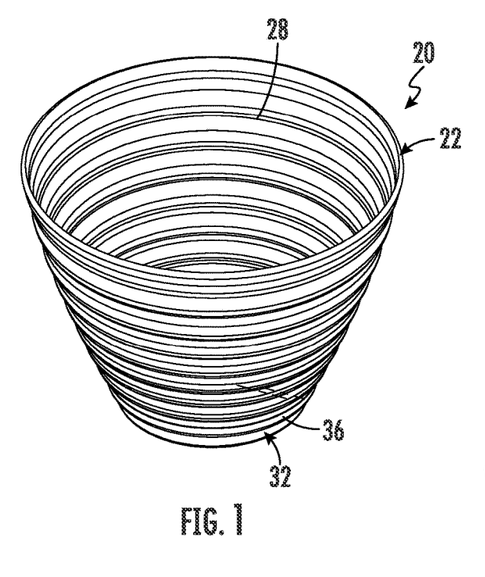
FIG. 1 is a perspective view of a top and a front of a pot assembly according to an embodiment, illustrated in a retracted position.
Figure 2:
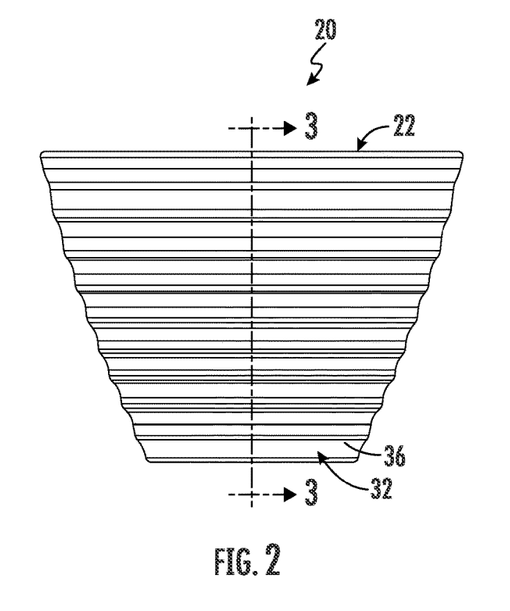
FIG. 2 is a side elevation view of the pot assembly of FIG. 1, illustrated in the retracted position.
Figure 3:
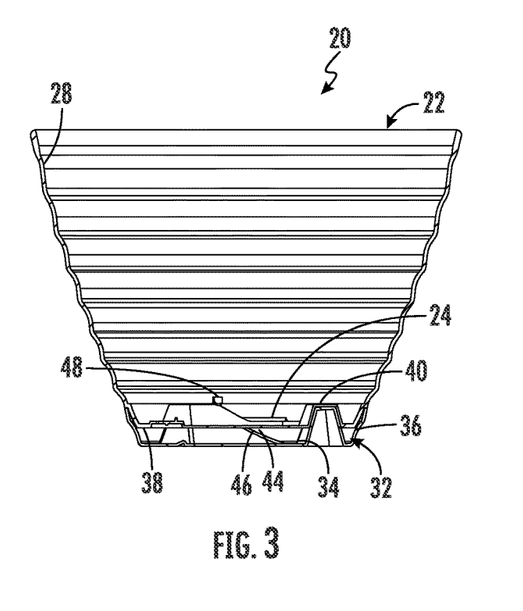
FIG. 3 is a side section view taken along section line 3-3 of the pot assembly in FIG. 2.

Referring now to FIG. 3, the base 24 of the pot 22 includes a plurality of cam surfaces 40 formed in an underside of the pot base 24. In the depicted embodiment, the cam surfaces 40 are formed in a radial array of three cam surfaces 40. Additionally, the cam surfaces 40 are each arranged around a center of the pot 22 as arcuate ramps with an incline that increases radially. Each of the cam surfaces 40 are formed into the underside of the pot base 24, with a complementary cam surface 42 formed in an upper surface of the pot base 24 as illustrated in FIGS. 3 and 4.

Figure 5:
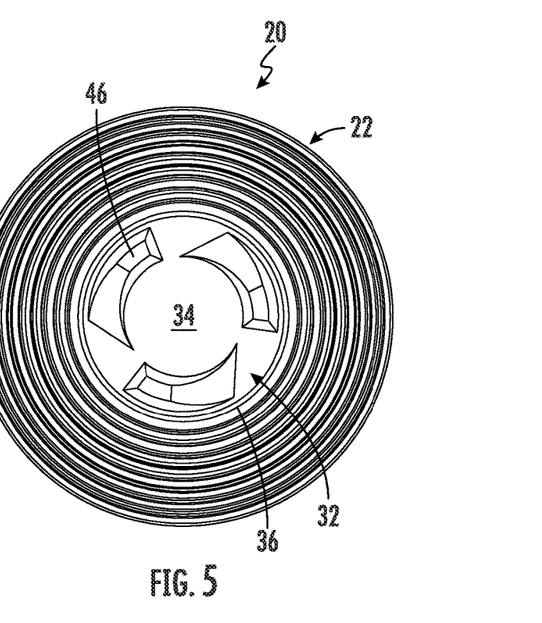
FIG. 5 is a bottom view of the pot assembly of FIG. 1, illustrated in the retracted position.
Figure 6:
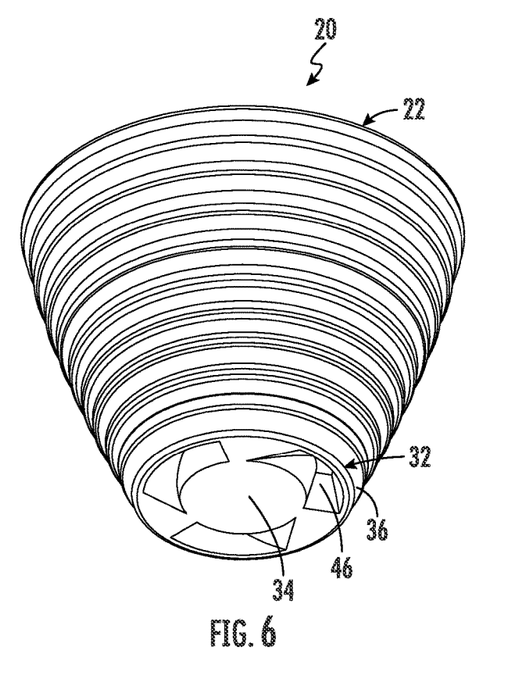
FIG. 6 is a perspective view of a bottom and the front of the pot assembly of FIG. 1, illustrated in the retracted position.
Figure 7:
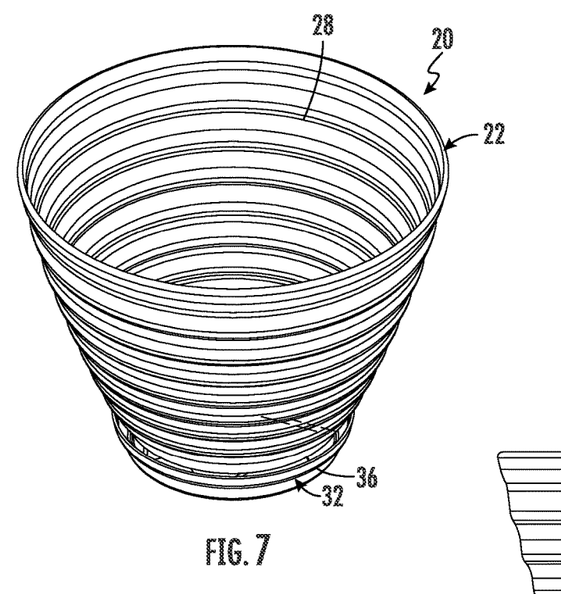
FIG. 7 is a perspective view of a top and a front of the pot assembly of FIG. 1, illustrated in an expanded position according to an embodiment.
Figure 8:
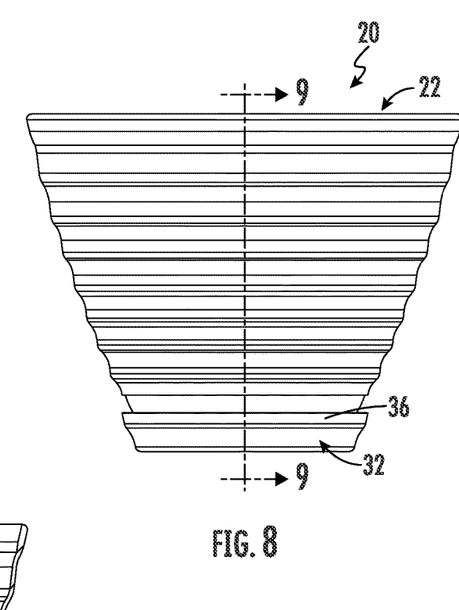
FIG. 8 is a side elevation view of the pot assembly of FIG. 7, illustrated in the expanded position.
Figure 9:
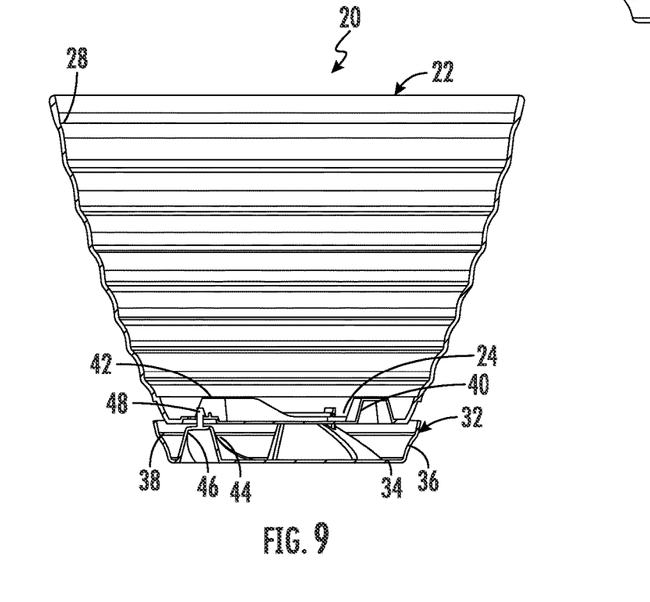
FIG. 9 is a side section view taken along section line 9-9 of the pot assembly in FIG. 8.
Figure 10:
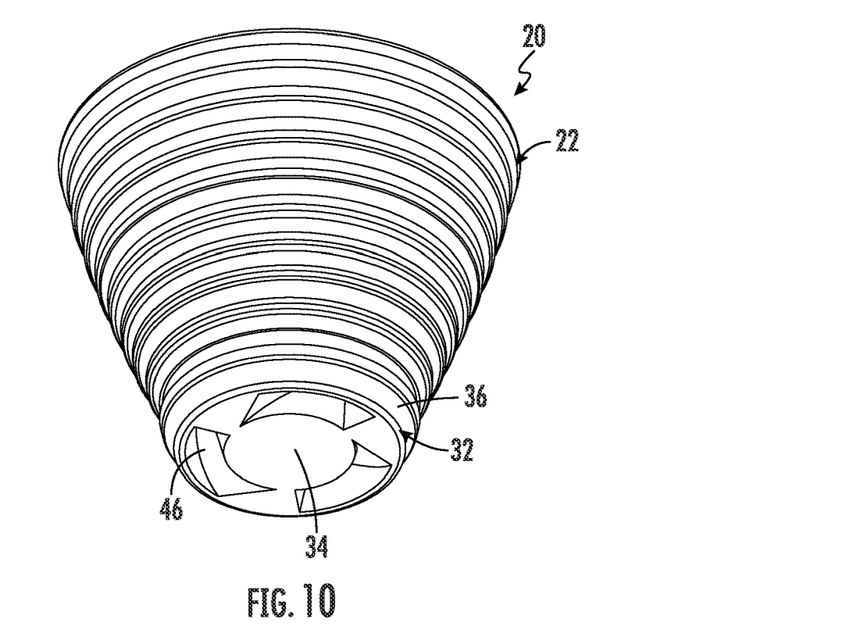
FIG. 10 is a perspective view of a bottom and the front of the pot assembly of FIG. 7, illustrated in the expanded position.

The saucer 32 also includes a plurality of cam surfaces 44 formed in an upper surface of the saucer base 34, which are also illustrated in FIG. 3. The cam surfaces 44 are sized to engage the cam surfaces 40 in the pot base 24. Likewise, the saucer cam surfaces 44 are arranged in a radial array of three cam surfaces 44, arranged around the center of the pot 22 as arcuate ramps with an incline that increases radially. Each of the saucer cam surfaces 44 are formed into the upper surface of the saucer base 34, with a complementary cam surface 46 formed in a lower surface of the saucer base 34 as illustrated in FIGS. 3, 5 and 6.

Referring again to FIG. 4, the drainage apertures 30 formed through the pot base 24 are formed as arcuate slots 30 each formed through one of the pot cam surfaces 40. Additionally, the arcuate slots 30 share a common center with the pot 22 and the pot cam surfaces 40.

Figure 4:
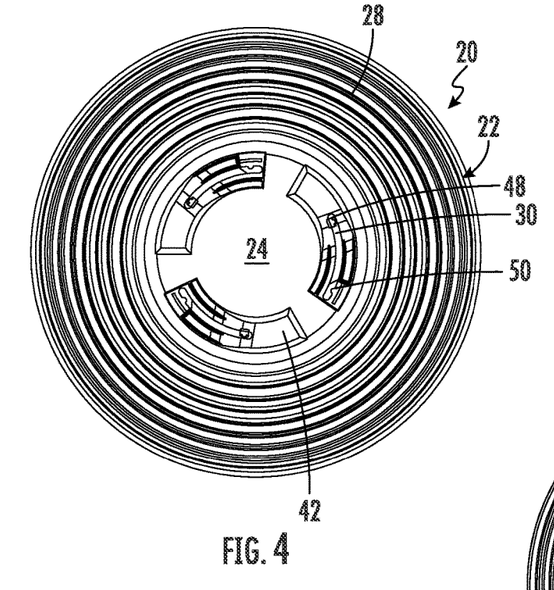
FIG. 4 is a top plan view of the pot assembly of FIG. 1, illustrated in the retracted position.

Referring now to FIGS. 3 and 4, the saucer 32 includes a plurality of retainers 48, each extending from one of the saucer cam surfaces 44. The retainers 48 each extend through one of the arcuate slots 30 for fastening the saucer 32 to the pot 22. Additionally, the retainers 48 are sized to slide within the arcuate slots 30 thereby pivotally connecting the pot 22 and the saucer 32.

As illustrated in FIG. 3, the cam surfaces 40 of the pot base 24 receive the cam surfaces 44 of the saucer base 34 in a collapsed and compact arrangement. The collapsed pot assembly 20 is illustrated in FIGS. 1-4 and 6. By rotating the pot 22 counter-clockwise in FIG. 4 relative to the saucer 32, the cam surfaces 44 of the saucer base 34 act as cam followers interfering with the cam surfaces 40 of the pot base 24 thereby diverging from the pot base 24 and extending the saucer 32 from the pot 22.

The extended position of the pot assembly 20 is illustrated in FIGS. 7-10. The saucer cam surfaces 44 are out of radial alignment with the pot cam surfaces 40 thereby diverging and expanding the pot 22 form the saucer 32. A reverse rotation of the pot 22 relative to the saucer 32, such as clockwise in FIG. 4, returns the cam surfaces 40, 44 into collapsed and converging cooperation for retraction of the saucer 32 as depicted in FIGS. 1-4 and 6.

Referring again to FIG. 4, a detent 50 may be provided in each arcuate slot 30. Each detent 50 engages one of the retainers 48 in the extended position of the pot assembly 20 to maintain the pot assembly 20 in the expanded position.

Figure 11:
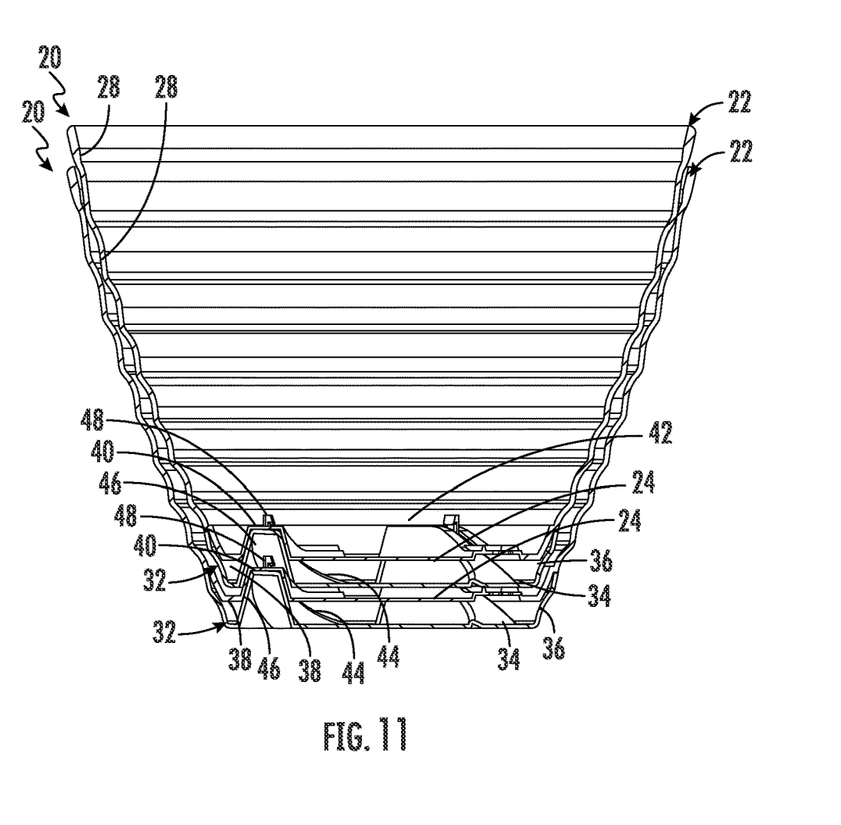
FIG. 11 is a side section view of a plurality of stacked pot assemblies according to an embodiment.
Figure 12:
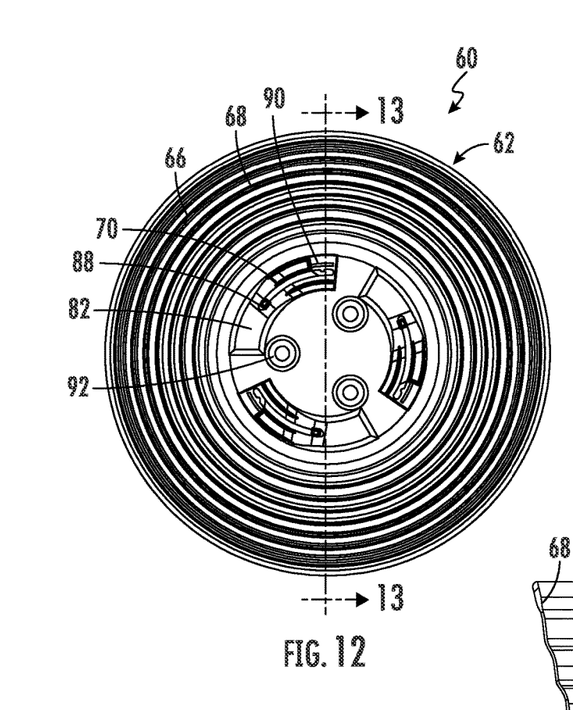
FIG. 12 is a top plan view of a pot assembly, according to an embodiment.

The collapsible and expandable features of the pot assembly 20 provide ornamental and functional options to the end user. These features also provide compactness for packaging and shipping. For example, once assembled, a manufacturer can collapse the pot assembly 20 for compact packaging. Additionally, and with reference to FIG. 11, one pot assembly 20 can be stacked upon another with the complementary cam surfaces 46 of the saucer 32 of the upper pot assembly 20 received upon the complementary cam surfaces 42 of the pot 22 of the lower pot assembly 20 for a compact stacked arrangement.

After shipping and unpackaging of the pot assemblies 20, the end user may expand the pot assembly 20 by rotating the pot 22 relative to the saucer 32 to expand the pot assembly 20.

FIGS. 12-16 illustrate a pot assembly 60 according to another embodiment. Similar to the prior embodiment, the pot assembly 60 includes a pot 62 with a base 64 (FIGS. 12, 13 and 16) and an upwardly extending sidewall 66. The base 64 and the sidewall 66 collectively provide a cavity 68. The pot assembly 60 also includes a plurality of arcuate slots 70 (FIG. 12) formed through the base 64 for permitting drainage of excess water.

Figure 16:
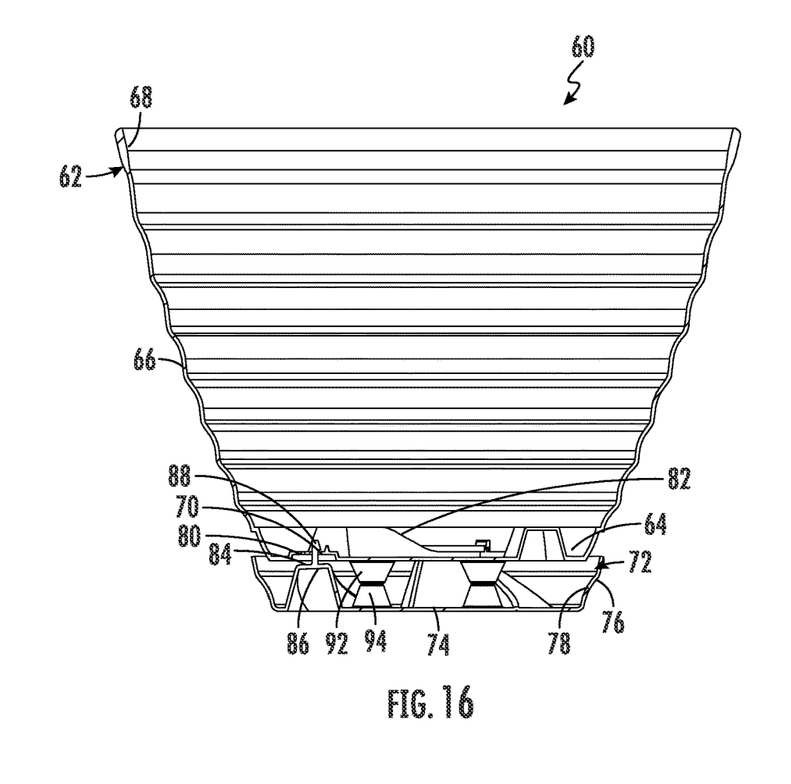
FIG. 16 is a side section view of the pot assembly of FIG. 12, illustrated in an expanded position according to an embodiment.

A saucer 72 is connected to the base 64 for receipt of excess drainage from the cavity 68. The saucer 72 also has a base 74 with a sidewall 76 to collectively provide a cavity 78 (FIG. 13) to receive and retain the drainage from the pot 62. Similar to the prior embodiment, the saucer 72 is connected to the pot 62 and cooperates with the pot 62 to extend and retract relative to the pot 62. The saucer 72 is illustrated in a retracted position in FIGS. 12-15. FIG. 16 illustrates the pot assembly 60 with the saucer 72 in an extended position for utilization of the saucer 72.

Figure 13:
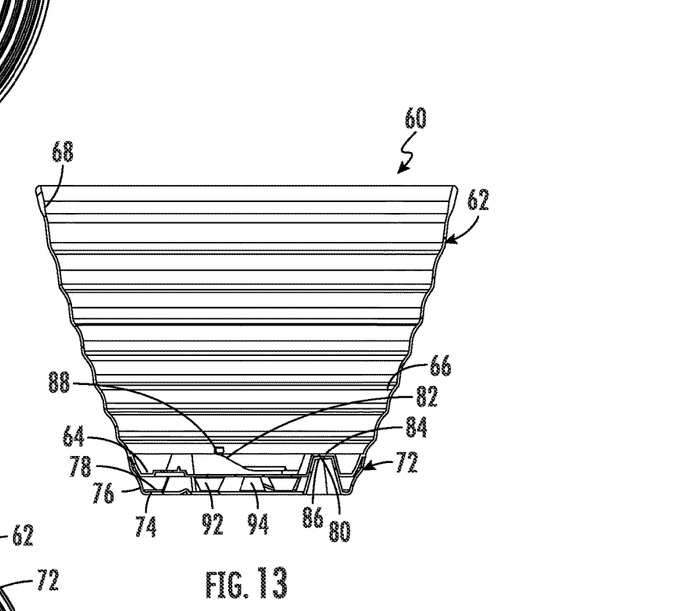
FIG. 13 is a side section view taken along section line 13-13 of the pot assembly in FIG. 12, illustrated in a retracted position according to an embodiment.
Figure 14:
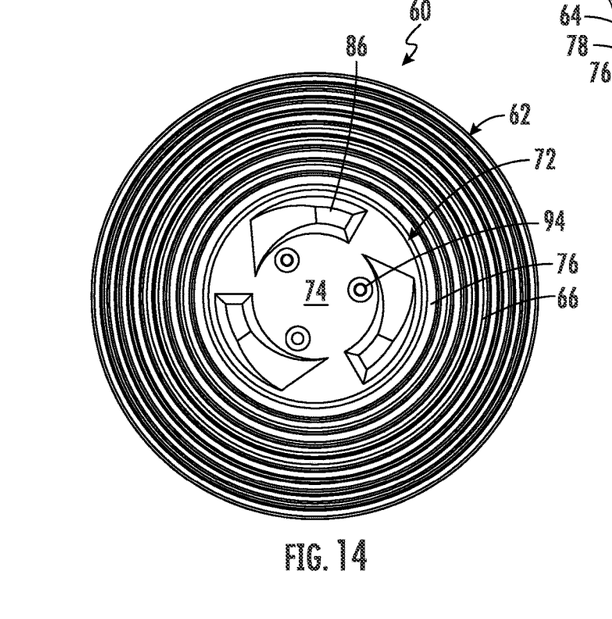
FIG. 14 is a bottom view of the pot assembly of FIG. 12.
Figure 15:
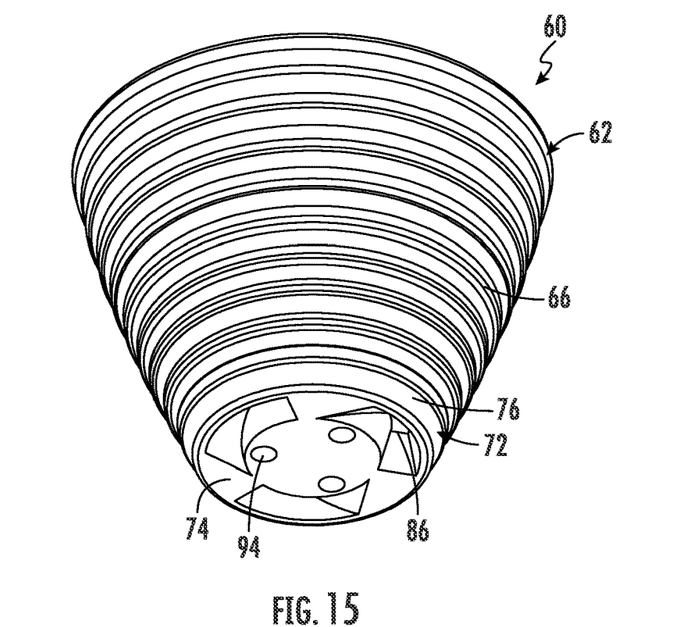
FIG. 15 is a perspective view of a bottom and a front of the pot assembly of FIG. 12, illustrated in the retracted position.

The base 64 of the pot 62 includes a radial array of three cam surfaces 80 (FIG. 13) formed in an underside of the pot base 64, with a complementary cam surface 82 formed in an upper surface of the pot base 64. The saucer 72 also includes a radial array of cam surfaces 84 formed in an upper surface of the saucer base 74, which are also illustrated in FIG. 13. The cam surfaces 84 are sized to engage the cam surfaces 80 in the pot base 64. Each of the saucer cam surfaces 84 are formed into the upper surface of the saucer base 74, with a complementary cam surface 86 formed in a lower surface of the saucer base 74 as illustrated in FIGS. 13-16. The saucer 72 also includes a plurality of retainers 88, each extending from one of the saucer cam surfaces 84, through one of the arcuate slots 70 for fastening the saucer 72 to the pot 62.

As illustrated in FIG. 13, the cam surfaces 80 of the pot base 64 receive the cam surfaces 84 of the saucer base 74 in a collapsed and compact arrangement. By rotating the pot 62 counter-clockwise in FIG. 12 relative to the saucer 72, the cam surfaces 84 of the saucer base 74 act as cam followers interfering with the cam surfaces 80 of the pot base 64 thereby diverging from the pot base 64 and extending the saucer 72 from the pot 62.

The extended position of the pot assembly 60 is illustrated in FIG. 16. The saucer cam surfaces 84 are out of radial alignment with the pot cam surfaces 80 thereby diverging and expanding the pot 62 form the saucer 72. A reverse rotation of the pot 62 relative to the saucer 72, such as clockwise in FIG. 12, returns the cam surfaces 80, 84 into collapsed and converging cooperation for retraction of the saucer 72.

Referring again to FIG. 12, a detent 90 may be provided in each arcuate slot 70. Each detent 90 engages one of the retainers 88 in the extended position of the pot assembly 60 to maintain the pot assembly 60 in the expanded position.

The cavity 68 in the pot is sized to receive potting materials, such as soil and pebbles, for planting a plant within the cavity 68. The pot assembly 60 is sized to receive a larger quantity of materials. In order to support these materials, additional structure is provided to the pot assembly 60. A radial array of three frusto-conical supports 92 extend down from the pot base 64. Another radial array of three frusto-conical supports 94 extend upward from the saucer base 74.

In the collapsed position of FIG. 13, the pot supports 92 engage the saucer base 74 and the saucer supports 94 engage the pot base 64 to distribute loading from the pot 62 to the saucer 72. This load distribution lessens the loading upon the cam surfaces 80, 84.

In the expanded position of FIG. 16, the pot supports 92 align with the saucer supports 94 and are supported upon the saucer supports 94. This alignment distributes loads from the pot 62 through the pot supports 92 to the saucer supports 94. Such loading also lessens the loading upon the cam surfaces 80, 84.

Figure 17:
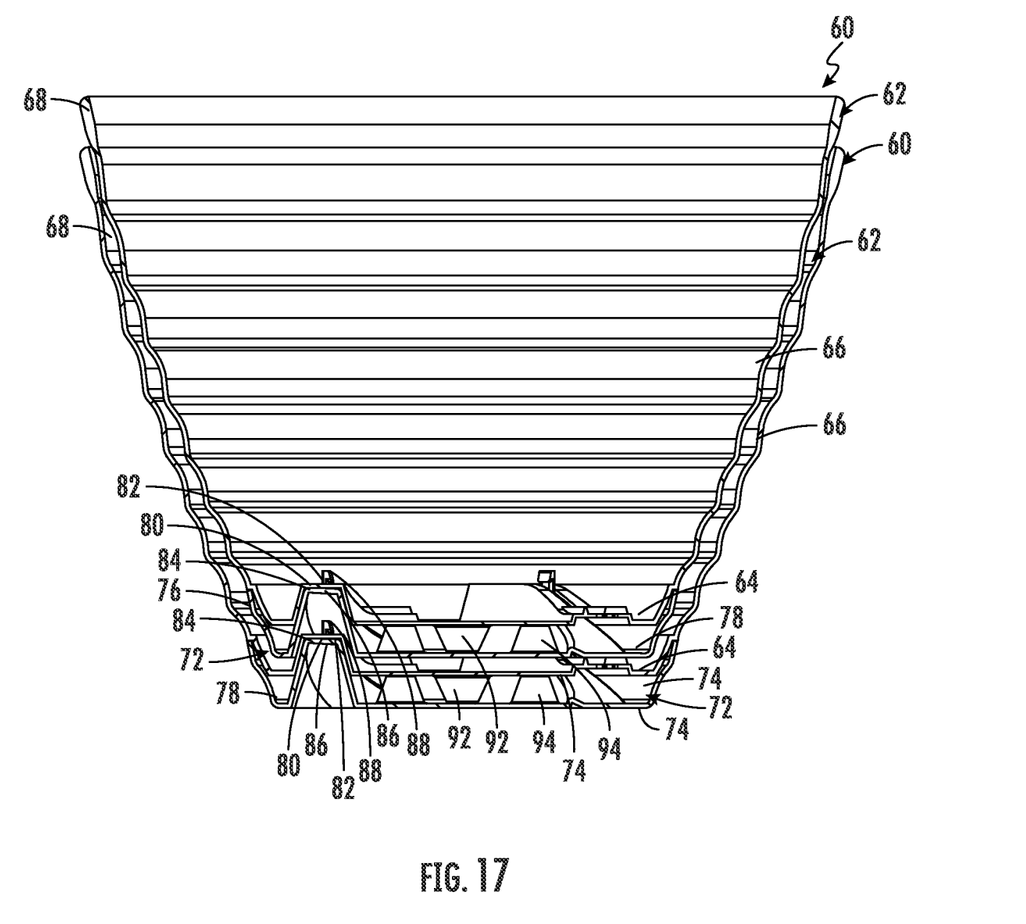
FIG. 17 is a side section view of plurality of stacked pot assemblies according to an embodiment.

Referring now to FIG. 17, one pot assembly 60 can be stacked upon another with the complementary cam surfaces 86 of the saucer 72 of the upper pot assembly 60 received upon the complementary cam surfaces 82 of the pot 62 of the lower pot assembly 60 for a compact stacked arrangement. This compactness assists in packing and shipping of multiple pot assemblies 60.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pot assembly comprising:
   a saucer;
   a pot with a base pivotally connected to, and supported upon the saucer; and
   a cam surface provided between the saucer and the pot so that rotation of the pot in a first rotary direction relative to the saucer extends the pot from the saucer, and rotation of the pot in a second rotary direction relative to the saucer retracts the pot to the saucer;
   wherein the cam surface is defined as:
      at least two cam surfaces formed beneath the base, and
      at least two cam surfaces formed in the saucer;
   wherein the at least two base cam surfaces cooperate with the at least two saucer cam surfaces to diverge in the first rotary direction to extend the pot from the saucer, and to collapse in the second rotary direction to retract the pot to the saucer;
   wherein at least two complementary surfaces are formed in the base, offset and corresponding to the at least two cam surfaces formed beneath the base; and wherein at least two complementary surfaces are formed in a lower surface of the saucer, offset and corresponding to the at least two cam surfaces formed in the saucer, wherein the at least two saucer complementary surfaces are sized to be received upon the at least two base complementary surfaces for collapsed and compact packing of multiple pot assemblies.

2. The pot assembly of claim 1 further comprising at least one fastener connecting the pot to the saucer.

3. The pot assembly of claim 1 wherein the pot comprises a sidewall extending from the base to collectively provide a cavity with the base.

4. The pot assembly of claim 3 wherein at least one aperture is provided in the base so that the saucer is in fluid communication with the cavity of the pot.

5. The pot assembly of claim 4 further comprising at least one fastener connecting the pot to the saucer.

6. The pot assembly of claim 5 wherein the at least one fastener is mounted to the saucer and cooperates in the at least one aperture in the base.

7. The pot assembly of claim 1 wherein the cam surface is defined as at least two cam surfaces formed in one of the base and the saucer; and
   wherein the pot assembly further comprises at least two cam followers formed in the other of the base and the saucer.

8. The pot assembly of claim 1 wherein the saucer comprises a first support extending from the saucer; and
   wherein the pot further comprises a second support extending down from the base to align with the first support in an extended position to collectively support the base relative to the saucer.

9. The pot assembly of claim 8 wherein the first support and the second support are each generally frusto-conical.

10. The pot assembly of claim 1 wherein the cam surface is arranged as a first series of arcuate ramps formed in the saucer; and
    wherein the cam surface is arranged as a corresponding second series of arcuate ramps formed in the base in cooperation with the first series of arcuate ramps so that rotation of the pot in the first rotary direction relative to the saucer extends the pot from the saucer, and rotation of the pot in the second rotary direction relative to the saucer retracts the pot to the saucer.

11. The pot assembly of claim 10 wherein the pot comprises a sidewall extending from the base to collectively provide a cavity with the base;
    wherein at least one aperture is provided in the base so that the saucer is in fluid communication with the cavity of the pot;
    wherein the pot assembly further comprises at least one fastener connecting the pot to the saucer; and
    wherein the at least one fastener is mounted to the saucer and cooperates in the at least one aperture in the base.

12. The pot assembly of claim 8 wherein the cam surface is arranged as a first series of arcuate ramps formed in the saucer; and
    wherein the cam surface is arranged as a second series of arcuate ramps formed beneath the base.

13. The pot assembly of claim 12 wherein the first series of arcuate ramps cooperate with the second series of arcuate ramps to expand in the first rotary direction to extend the pot from the saucer, and to collapse in the second rotary direction to retract the pot to the saucer.

14. The pot assembly of claim 13 wherein the first series of arcuate ramps is formed in a lower surface of the saucer;
    wherein the second series of arcuate ramps is formed in and beneath the base of the pot; and
    wherein the first series of arcuate ramps is sized to be received upon the second series of arcuate ramps for collapsed and compact packing of multiple pot assemblies.

15. A pot assembly comprising:
    a saucer;
    a pot with a base pivotally connected to, and supported upon the saucer; and
    a cam surface provided between the saucer and the pot so that rotation of the pot in a first rotary direction relative to the saucer extends the pot from the saucer, and rotation of the pot in a second rotary direction relative to the saucer retracts the pot to the saucer;
    wherein the cam surface is arranged as a first series of arcuate ramps formed in the saucer; and
    wherein the cam surface is arranged as a corresponding second series of arcuate ramps are formed in the base in cooperation with the first series of arcuate ramps so that rotation of the pot in the first rotary direction relative to the saucer extends the pot from the saucer, and rotation of the pot in the second rotary direction relative to the saucer retracts the pot to the saucer.

16. The pot assembly of claim 15 wherein the pot comprises a sidewall extending from the base to collectively provide a cavity with the base;
    wherein at least one aperture is provided in the base so that the saucer is in fluid communication with the cavity of the pot;
    wherein the pot assembly further comprises at least one fastener connecting the pot to the saucer; and
    wherein the at least one fastener is mounted to the saucer and cooperates in the at least one aperture in the base.

17. A pot assembly comprising:
    a saucer;
    a pot with a base pivotally connected to, and supported upon the saucer; and
    a cam surface provided between the saucer and the pot so that rotation of the pot in a first rotary direction relative to the saucer extends the pot from the saucer, and rotation of the pot in a second rotary direction relative to the saucer retracts the pot to the saucer;
    wherein the saucer comprises a first support extending from the saucer;
    wherein the pot further comprises a second support extending down from the base to align with the first support in an extended position to collectively support the base relative to the saucer;
    wherein the cam surface is arranged as a first series of arcuate ramps formed in the saucer; and
    wherein the cam surface is arranged as a second series of arcuate ramps are formed beneath the base.

18. The pot assembly of claim 17 wherein the first series of arcuate ramps cooperate with the second series of arcuate ramps to expand in the first rotary direction to extend the pot from the saucer, and to collapse in the second rotary direction to retract the pot to the saucer.

19. The pot assembly of claim 18 wherein the first series of arcuate ramps is formed in a lower surface of the saucer;
    wherein the second series of arcuate ramps is formed in and beneath the base of the pot; and
    wherein the first series of arcuate ramps is sized to be received upon the second series of arcuate ramps for collapsed and compact packing of multiple pot assemblies.

* * * * *

UNITED STATES PATENT AND TRADEMARK OFFICE
CERTIFICATE OF CORRECTION

PATENT NO. : 11,266,079 B2
APPLICATION NO. : 16/267717
DATED : March 8, 2022
INVENTOR(S) : Chun Hung et al.

It is certified that error appears in the above-identified patent and that said Letters Patent is hereby corrected as shown below:

In the Claims

Column 8, Line 18, Claim 15:
After "second series of arcuate ramps"
Delete "are".

Column 8, Line 51, Claim 17:
After "second series of arcuate ramps"
Delete "are".

Signed and Sealed this
Twenty-third Day of August, 2022

Katherine Kelly Vidal
*Director of the United States Patent and Trademark Office*